United States Patent
Hirano et al.

(10) Patent No.: US 6,782,172 B2
(45) Date of Patent: Aug. 24, 2004

(54) OPTICAL FIBER, OPTICAL TRANSMISSION LINE AND DISPERSION COMPENSATING MODULE

(75) Inventors: Masaaki Hirano, Yokohama (JP); Takatoshi Kato, Yokohama (JP)

(73) Assignee: Sumitomo Electric Industries, Ltd., Osaka (JP)

(*) Notice: Subject to any disclaimer, the term of this patent is extended or adjusted under 35 U.S.C. 154(b) by 89 days.

(21) Appl. No.: 09/884,945

(22) Filed: Jun. 21, 2001

(65) Prior Publication Data

US 2002/0001444 A1 Jan. 3, 2002

(30) Foreign Application Priority Data

Jun. 23, 2000 (JP) ........................................ 2000-189817

(51) Int. Cl.[7] ............................ G02B 6/02; G02B 6/16; G02B 6/22
(52) U.S. Cl. ........................ 385/123; 385/126; 385/127
(58) Field of Search ................................. 385/123–128

(56) References Cited

U.S. PATENT DOCUMENTS

| | | | | |
|---|---|---|---|---|
| 5,361,319 | A | 11/1994 | Antos et al. | 385/123 |
| 5,838,867 | A | 11/1998 | Onishi et al. | 385/123 |
| 6,263,138 | B1 | * 7/2001 | Sillard et al. | 385/123 |
| 6,445,864 | B2 | * 9/2002 | Jiang et al. | 385/127 |

FOREIGN PATENT DOCUMENTS

| JP | 6-11620 | 1/1994 | G02B/6/16 |
|---|---|---|---|

OTHER PUBLICATIONS

"Reduced dispersion slope, non–zero dispersion fiber", David W. Peckham, et al., ECOC, Sep. 1998, p. 139–140.

"1.5 terabit/s WDM transmission of 150 channels at 10Bbit/s over 4×100km of TeraLight™ fibre", Sebastien Bigo, et al., ECOC, 1999.

"Error free WDM transmission of 8×10 Gbit/s over km of LEAF™ optical fiber", Valeria L. da Silva, et al., ECOC, Sep. 1997, Conference Publication No. 448.

* cited by examiner

Primary Examiner—Brian Healy
Assistant Examiner—Kevin S Wood
(74) Attorney, Agent, or Firm—McDermott Will & Emery LLP

(57) ABSTRACT

Proposed are a dispersion compensating fiber and an optical transmission system that can, using a short length of the fiber, compensate the chromatic dispersion and the dispersion slope of a non-zero dispersion shifted fiber whose chromatic dispersion is +2 ps·nm$^{-1}$·km$^{-1}$ to +10 ps·nm$^{-1}$·km$^{-1}$ and whose dispersion slope is +0.04 ps·nm$^{-2}$·km$^{-1}$ to +0.12 ps·nm$^{-2}$·km$^{-1}$ at 1550 nm. In the optical transmission system 1, an optical transmission line 30 that consists of a dispersion-shifted fiber 31 and a dispersion compensation fiber 32 is installed between stations 10 and 20. The dispersion compensating fiber 32 has the chromatic dispersion of −250 ps·nm$^{-1}$·km$^{-1}$~−40 ps·nm$^{-1}$·km$^{-1}$ and the dispersion slope of 0.015 ps·nm$^{-2}$·km$^{-1}$~0.030 ps·nm$^{-2}$·km$^{-1}$ at 1550 nm.

23 Claims, 8 Drawing Sheets

OPTICAL FIBER, OPTICAL TRANSMISSION LINE AND DISPERSION COMPENSATING MODULE

BACKGROUND OF THE INVENTION

1. Field of the Invention

The present invention relates to a dispersion compensating optical fiber that compensates the chromatic dispersion and the dispersion slope of a dispersion-shifted optical fiber, an optical transmission line that includes the dispersion-shifted optical fiber and the dispersion compensating optical fiber, and a dispersion compensating module made of the dispersion compensating optical fiber.

2. Related Background Arts

In order to increase the transmission capacity in a Wavelength Division Multiplexing (WDM) transmission system, it is important to lessen the absolute magnitude of the cumulative chromatic dispersion of an optical transmission line as much as possible at a broad optical signal spectrum band. Generally, an attempt is made to reduce the absolute magnitude of the cumulative chromatic dispersion of an optical transmission line in a wide wavelength range by producing an optical transmission line by connecting plural kinds of optical fibers because it is difficult to do so in an optical transmission line using only one kind of optical fiber.

For example, Japanese Patent Application Laid-Open No. 6-11620 discloses a technique to reduce the absolute magnitude of the cumulative chromatic dispersion in the 1.55 μm wavelength band by connecting a standard single-mode fiber (SMF) which has a zero dispersion wavelength in the vicinity of the 1310 nm wavelength and which has a chromatic dispersion of about 15 ps·nm$^{-1}$·km$^{-1}$ at the 1550 nm wavelength and a dispersion compensating fiber (DCF) which compensates the chromatic dispersion of the single mode fiber at the 1550 nm wavelength. It is set forth that in order to reduce the absolute magnitude of the cumulative chromatic dispersion of an optical transmission line in a broad wavelength range that includes the 1550 nm wavelength, the relationship $(S_{DCF}/D_{DCF})=(S_{SMF}/D_{SMF})$ should be satisfied, when $D_{SMF}$ is the chromatic dispersion of a standard SMF at the 1550 nm wavelength, $S_{SMF}$ is the dispersion slope thereof, $D_{DCF}$ is the chromatic dispersion of a dispersion compensating optical fiber, and $S_{DCF}$ is the dispersion slope thereof.

When the chromatic dispersion at the 1550 nm wavelength of a non-zero dispersion shifted fiber (NZDSF) which has a positive small chromatic dispersion at the 1550 nm wavelength is represented as $D_{DSF}$, and the dispersion slope thereof is represented as $S_{DSF}$, $S_{DSF}/D_{DSF}$ is substantially great as compared with $S_{SMF}/D_{SMF}$. Therefore, with a dispersion compensating optical fiber for SMF described in the specification of Japanese Patent Application Laid-Open No. 6-11620, it is impossible to compensate the chromatic dispersion of the dispersion-shifted fiber and reduce the absolute magnitude of the cumulative chromatic dispersion of an optical transmission line with respect to all of the wavelengths over a wide range that includes the 1550 nm wavelength.

Also, U.S. Pat. No. 5,838,867 discloses a technology for reducing the absolute magnitude of the cumulative chromatic dispersion at the 1.55 μm wavelength band of an optical transmission line that is produced by connecting a non-zero dispersion shifted fiber and a dispersion compensating optical fiber which compensates the chromatic dispersion and the dispersion slope of the non-zero dispersion shifted fiber at the 1550 nm wavelength. However, in order to compensate both the chromatic dispersion and the dispersion slope of a non-zero dispersion shifted fiber, a long length of dispersion compensating optical fiber for NZDSF is needed because the dispersion compensating optical fiber for NZDSF of U.S. Pat. No. 5,838,867 has a small absolute magnitude of the chromatic dispersion.

For example, in the case of the non-zero dispersion shifted fiber described in Literature 1: S. Bigo, et al., "1.5 Terabit/s WDM transmission of 150 channels at 10 Gbit/s over 4×100 km of TeraLight™ fibre", ECOC '99, PD (1999), the chromatic dispersion is +8 ps·nm$^{-1}$·km$^{-1}$ and the dispersion slope is +0.06 ps·nm$^{-2}$·km$^{-1}$ at the 1550 nm wavelength. In the case of the non-zero dispersion shifted fiber described in Literature 2: David W. Peckham, et al., "Reduced dispersion slope, non-zero dispersion fiber", ECOC '98, pp.139–140 (1998), the chromatic dispersion is +4 ps·nm$^{-1}$·km$^{-1}$ and the dispersion slope is +0.046 ps·nm$^{-2}$·km$^{-1}$ at the 1550 nm wavelength. In the case of the non-zero dispersion shifted fiber described in Literature 3: Valeria L. da Silva, et al., "Error free WDM transmission of 8×10 Gbit/s over km of LEAF™ Optical Fiber", ECOC '97, No.448, pp.154–158 (1997), the zero dispersion wavelength is 1506 nm to 1514 nm, and the chromatic dispersion is about +4 to 5 ps·nm$^{-1}$·km$^{-1}$ and the dispersion slope is about +0.1 ps·nm$^{-2}$·km$^{-1}$ at the 1550 nm wavelength. To compensate the chromatic dispersion of 80 km of non-zero dispersion shifted fibers described in these literatures requires 8 km to 16 km lengths of the dispersion compensating optical fiber for NZDSF described in U.S. Pat. No. 5,838,867. Furthermore, in such case, it is impossible to sufficiently compensate both the chromatic dispersion and the dispersion slope at the same time.

Generally, a dispersion compensating optical fiber for a dispersion-shifted optical fiber is prone to leakage of the fundamental mode light at a slight bend thereof, and the bending loss of the fundamental mode light is large. Therefore, the transmission loss increases when it is formed into a cable and installed, or when it is wound on a bobbin to form a dispersion compensating module. As a result, in an optical transmission system that performs optical communication by allowing light signals to propagate through an optical transmission line that is produced by connecting a dispersion-shifted optical fiber and a dispersion compensating optical fiber for the dispersion-shifted optical fiber, the transmission loss is large in the optical transmission line. Accordingly, increasing the span of a transmission section (i.e. a distance between repeater stations) is not feasible, and it is difficult to achieve further increase in capacity of optical communication.

SUMMARY OF THE INVENTION

An object of the present invention is to provide a dispersion compensating optical fiber that can, with a relatively short length thereof, compensate both the chromatic dispersion and the dispersion slope of a non-zero dispersion shifted fiber at a wide spectrum band that includes the 1550 nm wavelength. Another object of the present invention is to provide an optical transmission line that includes a non-zero dispersion shifted fiber and a dispersion compensating optical fiber whose transmission loss is relatively small. A further object of the present invention is to provide a dispersion compensating module that compensates both the chromatic dispersion and the dispersion slope of a non-zero dispersion shifted fiber.

In order to achieve these objects, an optical fiber that satisfies the following relational expressions is provided:

$-250\ ps\cdot nm^{-1}\cdot km^{-1} \leq D_{DCF} \leq -40\ ps\cdot nm^{-1}\cdot km^{-1}$ $0.015\ nm^{-1} \leq S_{DCF}/D_{DCF} \leq 0.030\ nm^{-1}$, where $D_{DCF}$ is the chromatic dispersion at the 1550 nm wavelength and $S_{DCF}$ is the dispersion slope thereof.

In this optical fiber, the effective area may be in a range of from 13 $\mu m^2$ to 17 $\mu m^2$, from 17 $\mu m^2$ to 20 $\mu m^2$, or equal to or more than 20 $\mu m^2$ at the 1550 nm wavelength. The cutoff wavelength may be from 1.2 $\mu m$ to 1.8 $\mu m$, and the transmission loss may be 0.5 dB/km or less at the 1550 nm wavelength. The term "cutoff wavelength" as used herein means the cutoff wavelength of the $LP_{11}$ mode that is measured in a state where an optical fiber of 2 m length is loosely wound once at a radius of 140 mm.

This optical fiber may have a central core region having a first refractive index, a first cladding region surrounding the central core region and having a second refractive index that is smaller than the first refractive index, a second cladding region surrounding the first cladding region and having a third refractive index that is greater than the second refractive index, and a third cladding region surrounding the second cladding region and having a fourth refractive index that is smaller than the third refractive index. In this case, the variation of the ratio ($S_{DCF}/D_{DCF}$) may be equal to or less than 10% when the outer diameter of the central core region is altered by 2% while the ratios between the outer diameters between the respective regions (the central core region, first cladding region, second cladding region and third cladding region) are kept constant. The region of the outermost layer may be silica glass doped with F element, P element or Cl element.

Moreover, an optical transmission line is provided which is installed at a transmission section by connecting the above-mentioned optical fiber and a dispersion-shifted optical fiber whose chromatic dispersion is in the range of +2 $ps\cdot nm^{-1}\cdot km^{-1}$ to +10 $ps\cdot nm^{-1}\cdot km^{-1}$ at the 1550 nm wavelength and whose dispersion slope is in the range of +0.04 $ps\cdot nm^{-2}\cdot km^{-1}$ to +0.12 $ps\cdot nm^{-2}\cdot km^{-1}$ at the 1550 nm wavelength. This optical transmission line may have a multiplexer/demultiplexer that introduces pump light for Raman amplification, and the deviation of the average chromatic dispersion may be equal to or less than 0.2 $ps\cdot nm^{-1}\cdot km^{-1}$ at a wavelength ranging from 1535 nm to 1560 nm.

In addition, a dispersion compensating module containing an optical fiber in a coil form is provided. Such coil may have an arbor or no arbor in it. In the latter case, the coil may be fixed by filling the inner space of the module with a resin.

The above and further objects and novel features of the invention will be more fully clarified from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Figure 1:
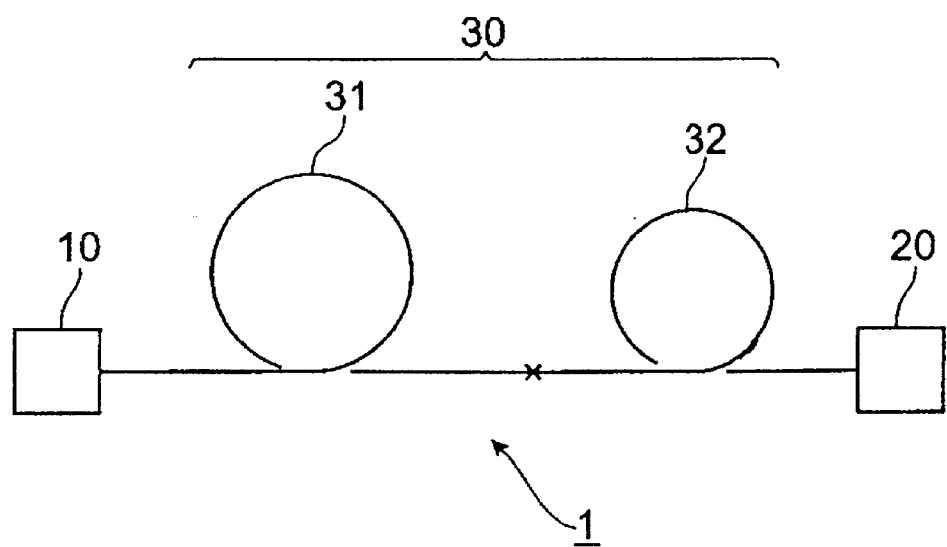
FIG. 1 is a schematic diagram of an optical transmission system that includes the optical transmission line according to one embodiment of the present invention.

In the following, preferred embodiments of the present invention will be explained in detail with reference to the accompanying drawings. To facilitate the comprehension of the explanation, the same reference numerals denote the same parts, where possible, throughout the drawings, and a repeated explanation will be omitted. The dimensions in the drawings are partly exaggerated and do not always correspond to actual ratios of dimensions.

FIG. 1 is a schematic diagram of an optical transmission system 1 that includes an optical transmission line 30 according to one embodiment of the present invention. The optical transmission system 1 is composed of the optical transmission line 30 that is installed at a transmission section between a station (a transmitting station or repeater station) 10 and a station (a receiving station or repeater station) 20. The optical transmission line 30 comprises a dispersion-shifted optical fiber 31 and a dispersion compensating optical fiber 32 that are fusion-spliced together. In the optical transmission system 1, light signals of multi-wavelengths in the 1.55 μm wavelength band that have been emitted from the station 10 propagate through the dispersion-shifted optical fiber 31 and the dispersion compensating optical fiber 32, and reach the station 20, where they are received, or optically amplified and discharged to the downstream.

The dispersion-shifted optical fiber 31 is a non-zero dispersion shifted fiber having a chromatic dispersion in the range of about +2ps·nm$^{-1}$·km$^{-1}$ to +10 ps·nm$^{-1}$·km$^{-1}$ at the 1550 nm wavelength. The dispersion-shifted optical fiber 31 has a dispersion slope $S_{DSF}$ in the range of +0.04ps·nm$^{-2}$·km$^{-1}$ to +0.12 ps·nm$^{-2}$·km$^{-1}$ at the 1550 nm wavelength and its transmission loss is about 0.2 dB/km.

The dispersion compensating optical fiber 32 according to the present embodiment is a silica-based optical fiber that compensates both the chromatic dispersion and the dispersion slope of the dispersion-shifted optical fiber 31 at the 1550 nm wavelength. The dispersion compensating optical fiber 32 has a chromatic dispersion $D_{DCF}$ in the range of −250 ps·nm$^{-1}$·km$^{-1}$ to −40 ps·nm$^{-1}$·Km at the 1550 nm wavelength. The ratio ($S_{DCF}/D_{DCF}$) of the chromatic dispersion $D_{DCF}$ and the dispersion slope $S_{DCF}$ is 0.015/nm to 0.030/nm. The dispersion compensating optical fiber 32 has an effective area equal to or more than 13 μm$^2$ at the 1550 nm wavelength. Its cutoff wavelength is 1.2 μm to 1.8 μm, and preferably 1.4 μm to 1.8 μm. The transmission loss is 0.5 dB/km or less at the 1550 nm wavelength.

The dispersion compensating optical fiber 32 having such characteristics D enables a short length thereof to compensate the chromatic dispersion and the dispersion slope of the dispersion-shifted optical fiber 31 over a wide spectrum band that includes the 1550 nm wavelength. The dispersion compensating optical fiber 32 can also restrain the occurrence of four-wave mixing as well as the waveform degradation of propagating light signals because it has the chromatic dispersion in the numerical range as set forth above and the effective area is also sufficiently large. Also, the dispersion compensating optical fiber 32 can restrain the increase of bending loss because the cutoff wavelength is within the numerical range as set forth above. Furthermore, the transmission loss is within the numerical range described above. Therefore, even when the dispersion compensating optical fiber 32 is formed into a cable, the optical transmission line 30 yields relatively small loss.

Especially, if the effective area at the 1550 nm wavelength is in the range of 13 μm$^2$ to 17 μm$^2$, the dispersion compensating optical fiber 32 can restrain the occurrence of the four-wave mixing that causes the waveform degradation of propagating light signals. Also, it can be used in the form of either a module or a cable because its bending loss is small. If the effective area is in the range of 17 μm$^2$ to 20 μm$^2$, the dispersion compensating optical fiber 32 can sufficiently restrain the waveform degradation of light signals and can be used as a module. If the effective area is equal to or more than 20 μm$^2$, the dispersion compensating optical fiber 32 can restrain the waveform degradation of light signals more sufficiently. The dispersion compensating optical fiber 32 can be used in a module having a special structure in which bending loss does not easily occur. For example, it can be used for a module that is suitable for including a coil of relatively large bending radius or module that includes a coil without an arbor and fixed therein with a resin.

The optical transmission line 30, which is produced by connecting the dispersion-shifted optical fiber 31 and the dispersion compensating optical fiber 32 at a ratio of length that lessens the absolute magnitude of the total average chromatic dispersion at 1550 nm, has a total average dispersion slope of relatively small absolute magnitude at the 1550 nm wavelength. Accordingly, the optical transmission line 30 has a total average chromatic dispersion of decreased absolute magnitude at the wide spectrum band that includes the 1550 nm wavelength. The average transmission loss of the optical transmission line 30 as a whole is also decreased. As for the average chromatic dispersion of the whole optical transmission line 30, the difference between the maximum value and the minimum value preferably is equal to or less than 0.4 ps·nm$^{-1}$·km$^{-1}$ in the spectrum band of 1535 nm to 1560 nm (C-band), and more preferably is equal to or less than 0.4 ps·nm$^{-1}$·km$^{-1}$ in the spectrum band of 1535 nm to 1600 nm (C-band and L band). The optical transmission system 1 that performs optical communication by allowing light signals to propagate through the optical transmission line 30 can achieve optical transmission in the transmission distance of 400 km with high bit rates such as 40 Gbit/s in a wide spectrum band (a spectrum band that includes at least C-band, and moreover, L band as well) that includes the 1550 nm wavelength, since the absolute magnitude of the average chromatic dispersion as well as the average transmission loss of the optical transmission line 30 is relatively small. Therefore, the span of a transmission section can be elongated in the optical transmission system 1, and it is possible to achieve further increase in the capacity of optical communication.

Figure 2:
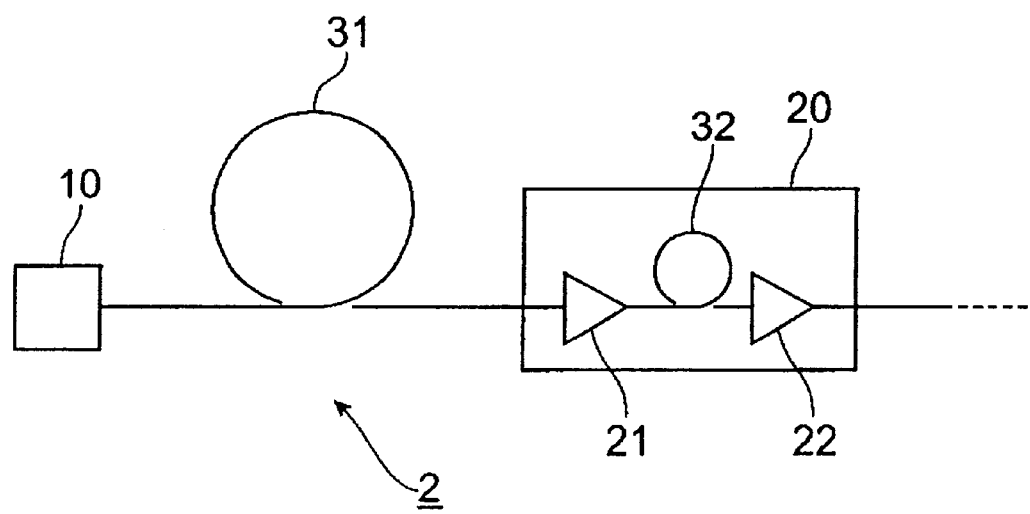
FIG. 2 is a schematic diagram of an optical transmission system where a dispersion-shifted optical fiber is installed as an optical transmission line and a dispersion compensating optical fiber is provided inside a station as a dispersion compensating module.

FIG. 2 is a schematic diagram of an optical transmission system 2, where the dispersion-shifted optical fiber 31 is installed as an optical transmission line, and the dispersion compensating optical fiber 32 is placed inside the station 20 as a dispersion compensating module. In the optical transmission system 2, the dispersion-shifted optical fiber 31 is installed as an optical transmission line at a transmission section between the station (a transmitting station or repeater station) 10 and the station (a receiving station or repeater station) 20. In the optical transmission system 2, light signals of multi-wavelengths in the 1.55 μm wavelength band that have been emitted from the station 10 propagate through the dispersion-shifted optical fiber 31 which is an optical transmission line, and reach the station 20, where they are optically amplified by an optical amplifier 21, and are compensated for the dispersion by the dispersion compensating optical fiber 32 as a dispersion compensating module, and further optically amplified by an optical amplifier 22, and then are received there or discharged to the downstream.

In the optical transmission system 2, the dispersion compensating optical fiber 32 is in a coil form contained in a module placed inside the station 20. The coil may have an arbor or no arbor in it. In the latter case, the coil may be fixed by filling the inner space of the module with a resin.

As in the case of the dispersion compensating optical fiber 32 of the optical transmission system 1, the dispersion compensating optical fiber 32 of the optical transmission system 2 can compensate both the chromatic dispersion and the dispersion slope of the dispersion-shifted optical fiber 31 at a short length in a wide spectrum band that includes a 1550 nm wavelength. It can also restrain the occurrence of four-wave mixing, the waveform degradation of propagating light signals, and the increase of bending loss. Moreover, the dispersion compensating optical fiber 32 yields low loss even if it is contained in a module.

Also, in the optical transmission system 2, as in the case of the optical transmission system 1, the part consisting of the dispersion-shifted optical fiber 31 and the dispersion compensating optical fiber 32 has a decreased absolute magnitude of the average chromatic dispersion in a wide spectrum band that includes the 1550 nm wavelength, and the average transmission loss also is small if these fibers are connected at a ratio of length such that the absolute magnitude of the total average chromatic dispersion decreases at 1550 nm. The difference between the maximum and minimum value of the average chromatic dispersion of such part preferably is equal to or less than 0.4 ps·nm$^{-1}$·km$^{-1}$ in the spectrum band of 1535 nm to 1560 nm (C-band), and more preferably is equal to or less than 0.4 ps·nm$^{-1}$·km$^{-1}$ in the spectrum band of 1535 nm to 1600 nm (C-band and L band).

The dispersion compensating optical fiber 32 as a dispersion compensating module yields a total loss preferably equal to or less than 7 dB in the spectrum band of 1535 nm to 1565 nm (C-band), and more preferably equal to or less than 7 dB in the spectrum band of 1535 nm to 1610 nm (C-band and L band) when the dispersion compensating quantity is −640 ps/nm at the 1550 nm wavelength. Also, the dispersion compensating optical fiber 32 as a dispersion compensating module yields total loss preferably equal to or less than 3 dB in the spectrum band of 1535 nm to 1565 nm (C-band), and more preferably equal to or less than 3 dB in the spectrum band of 1535 nm to 1610 nm (C-band and L band) when the dispersion compensating quantity at the 1550 nm wavelength is −320 ps/nm.

The optical transmission system 2 has a relatively small average transmission loss and a small absolute magnitude of the average chromatic dispersion, and can transmit light at a high bit rate in a wide spectrum band (spectrum band that includes at least C-band, and moreover L-band as well) that includes the 1550 nm wavelength. Therefore, the optical transmission system 2 enables the lengthening of a transmission section and the increase of the capacity of optical communication.

Figure 3:
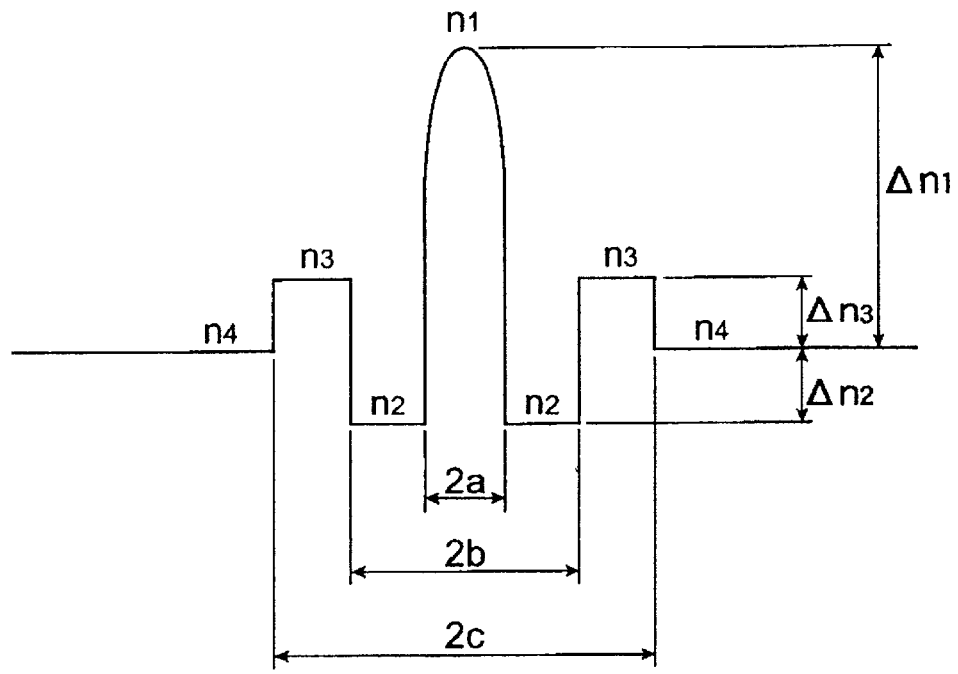
FIG. 3 depicts a first preferable example of the refractive index profile of a dispersion compensating optical fiber according to one embodiment of the present invention.

FIG. 3 depicts a first preferable example of a refractive index profile of a dispersion compensating optical fiber according to one embodiment of the present invention. A dispersion compensating optical fiber having the refractive index profile shown in FIG. 3 has a central core region (maximum refractive index $n_1$, outer diameter 2a) that includes the center of optical axis, a first cladding region (refractive index $n_2$, outer diameter 2b) that surrounds the central core region, a second cladding region (refractive index $n_3$, outer diameter 2c) that surrounds the first cladding region, and a third cladding region (refractive index $n_4$) that surrounds the second cladding region. The dimensional relationship between the respective refractive indexes is $n_2 < n_4 < n_3 < n_1$. Preferably, the relative refractive index difference $\Delta n_1$ of the central core region is 0.8% to 2.0%, and the relative refractive index difference $\Delta n_2$ of the first cladding region is equal to or less than −0.4%, on the basis of the refractive index $n_4$ of the third cladding region. The relative refractive index difference of the second cladding region is represented as $\Delta n_3$ on the basis of the refractive index $n_4$ of the third cladding region. Such a refractive index profile can be produced by using the known VAD, OVD, MCVD and PCVD methods in combination.

Such a refractive index profile enables a dispersion compensating optical fiber to have a chromatic dispersion $D_{DCF}$ in the range of −250 ps·nm$^{-1}$·km$^{-1}$ to −40 ps·nm$^{-1}$·km$^{-1}$, a ratio ($S_{DCF}/D_{DCF}$) in the range of 0.015 nm$^{-1}$ to 0.030 nm$^{-1}$, an effective area of 13 $\mu$m$^2$ or more, a cutoff wavelength in the range of 1.2 $\mu$m to 1.8 $\mu$m, transmission loss equal to or less than 0.5 dB/km, at the 1550 nm wavelength. A dispersion compensating optical fiber having such a refractive index profile is mainly made of silica glass, and preferably doped with, for example, GeO$_2$ in both the central core region and the second cladding region, and F element in the first cladding region. Also, the third cladding region is preferably doped with F element, P element or Cl element. In this manner, the refractive index profile shown in FIG. 3 can be obtained, and the transmission loss of the dispersion compensating optical fiber can be reduced at the 1550 nm wavelength.

For example, if the dispersion compensating optical fiber of the first example is designed to satisfy: 2a/2c=0.18, 2b/2c=0.56, 2c=21.0 $\mu$m, $\Delta n_1$=+1.6 dispersion compensating optical fiber of the first example has the chromatic dispersion $D_{DCF}$ of −105 ps·nm$^{-1}$·km$^{-1}$, the dispersion slope $S_{DSF}$ of −1.97 ps·nm$^{-2}$·km$^{-1}$, the ratio ($S_{DCF}/D_{DCF}$) of 0.019/nm, the effective area of 17 $\mu$m$^2$, the bending loss of 1.1 dB/m at the bend diameter of 20 mm$\phi$, and the cutoff wavelength of 1.57 $\mu$m.

Figure 4:
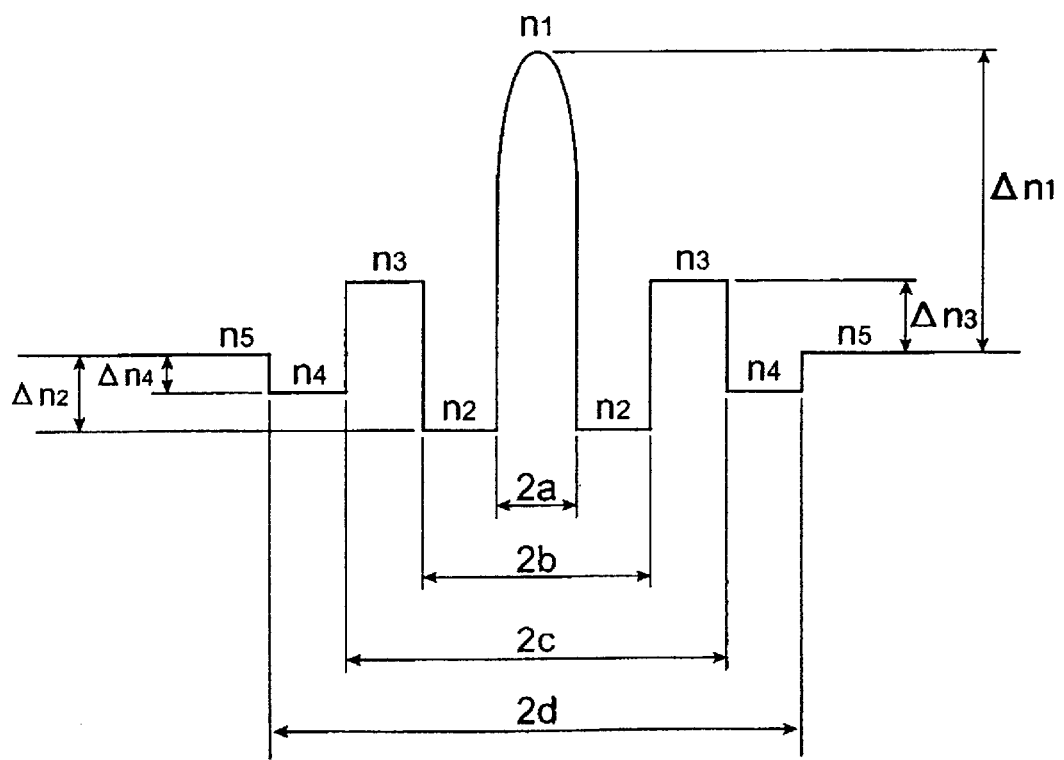
FIG. 4 depicts a second preferable example of the refractive index profile of a dispersion compensating optical fiber according to one embodiment of the present invention.

FIG. 4 depicts a second preferable example of the refractive index profile of the dispersion compensating optical fiber according to one embodiment of the present invention. The dispersion compensating optical fiber having the refractive index profile shown in FIG. 4 has an outer diameter 2d in the third cladding region of the dispersion compensating optical fiber having the refractive index profile of the first preferable example, and has a fourth cladding region (refractive index $n_5$) that surrounds the third cladding region. The dimensional relationship of the respective refractive indexes is $n_1 > n_2$, $n_2 < n_3$, $n_3 > n_4$, and $n_4 < n_5$. Also, on the basis of the refractive index $n_5$ of the fourth cladding region, preferably the relative refractive index difference $\Delta n_1$ of the central core region is in the range of 0.8% to 2.0%, and the relative refractive index difference $\Delta n_2$ of the first cladding region is equal to or less than −0.4%. The relative refractive index difference of the second cladding region is represented as $\Delta n_3$, and the relative refractive index difference of the third cladding region is represented as $\Delta n_4$ in reference to the refractive index $n_5$ of the fourth cladding region.

The dispersion compensating optical fiber having such refractive index profile is mainly made of silica glass, and preferably doped with, for example, GeO$_2$ in both the central core region and the second cladding region, F element in both the first cladding region and the third cladding region, and F element, P element or Cl element in the fourth cladding region. For example, for the dispersion compensating optical fiber of a second example, assuming: 2a/2d=0.15, 2b/2d=0.48, 2c/2d=0.88, 2d=24.6 $\mu$m, $\Delta n_1$=+1.6%, $\Delta n_2$=−0.5%, $\Delta n_3$=+0.2% $\Delta n_4$=−0.1%, then, at the 1550 nm wavelength the dispersion compensating optical fiber of the second example has the chromatic dispersion $D_{DCF}$ of −130 ps·nm$^{-1}$·km$^{-1}$, the dispersion slope $S_{DSF}$ of −2.39 ps·nm$^{-2}$·km$^{-1}$, the ratio ($S_{DCF}/D_{DCF}$) of 0.018/nm, the effective area of 18 $\mu$m$^2$, the bending loss of 2.0 dB/m at the bend diameter of 20 mm $\phi$, the cutoff wavelength of 1.51 $\mu$m, and the transmission loss of 0.38 dB/km.

Figure 5:
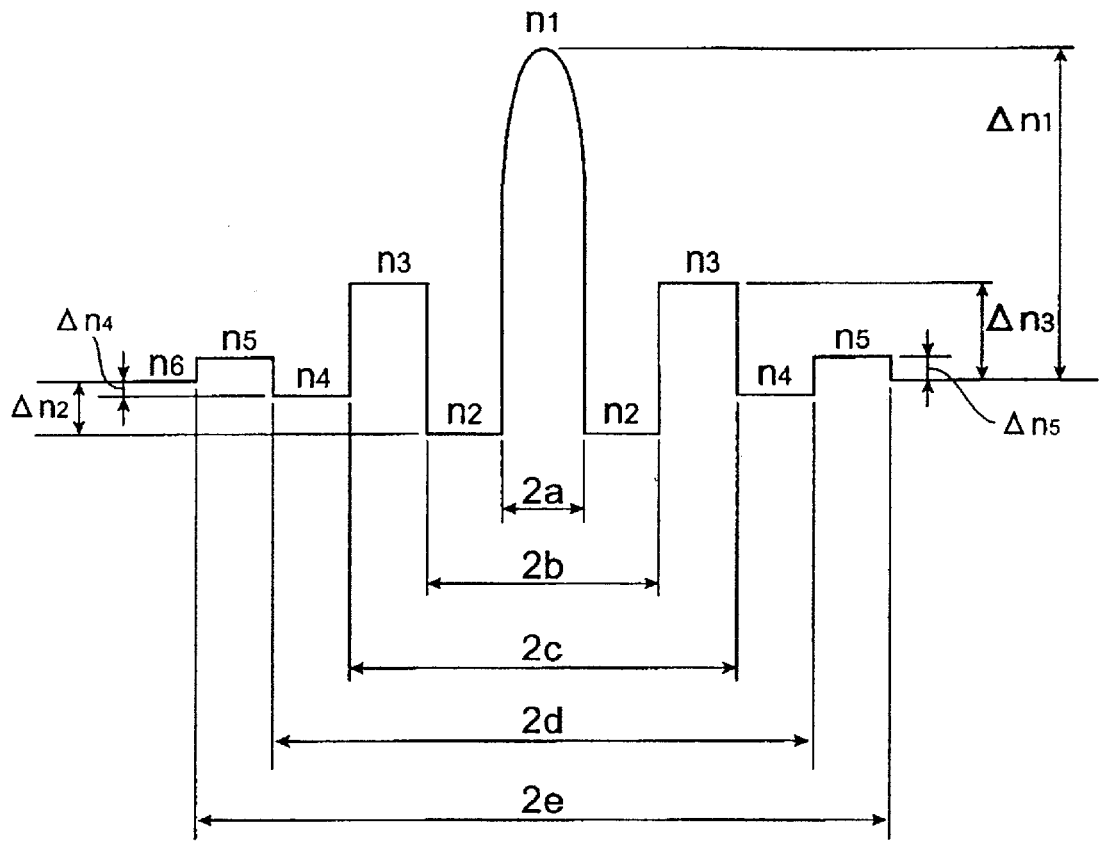
FIG. 5 depicts a third preferable example of the refractive index profile of a dispersion compensating optical fiber according to one embodiment of the present invention.

FIG. 5 depicts a third preferable example of the refractive index profile of the dispersion compensating optical fiber according to one embodiment of the present invention. The dispersion compensating optical fiber having the refractive index profile shown in FIG. 5 has an outer diameter 2e in the fourth cladding region of the dispersion compensating optical fiber having the refractive index profile of the second preferable example, and has a fifth cladding region (refractive index $n_6$) that surrounds the fourth cladding region. The dimensional relationship of the respective refractive indexes is $n_1 > n_2$, $n_2 < n_3$, $n_3 > n_4$, $n_4 < n_5$, $> n_6$. Also, on the basis of the refractive index $n_6$ of the fifth cladding region, preferably the relative refractive index difference $\Delta n_1$ of the central core region is 0.8% to 2.0%, and the relative refractive index difference $\Delta n_2$ of the first cladding region is equal to or less than −0.4%. The relative refractive index difference of the second cladding region is represented as $\Delta n_3$, the relative refractive index difference of the third cladding region is represented as $\Delta n_4$, and the relative refractive index difference of the fourth cladding region is represented as $\Delta n_5$ in reference to the refractive index $n_6$ of the fifth cladding region.

The dispersion compensating optical fiber having such refractive index profile is mainly made of silica glass, and preferably doped with, for example, $GeO_2$ in the central core region, the second cladding region, and the fourth cladding region, respectively, F element in the first cladding region, and F element, P element or Cl element in both the third cladding region and the fifth cladding region.

For example, for the dispersion compensating optical fiber of the third example, assuming: $2a/2e$=0.17, $2b/2e$=0.48, $2c/2e$=0.83, $2d/2e$=0.95, $2e$=24.7 μm, $\Delta n_1$=+1.6%, $\Delta n_2$=−0.5%, $\Delta n_3$=+0.2%, $\Delta n_4$=0%, $\Delta n_5$=+0.1%, then, at the 1550 nm wavelength, the dispersion compensating optical fiber of the third example has the chromatic dispersion $D_{DCF}$ of −111 ps·nm$^{-1}$·km$^{-1}$, the dispersion slope $S_{DSF}$ of −2.01 ps·nm$^{-2}$·km$^{-1}$, the ratio ($S_{DCF}/D_{DCF}$) of 0.018/nm, the effective area of 18 μm$^2$, the bending loss of 6.0 dB/m at the bend diameter of 20 mm φ, the cutoff wavelength of 1.53 μm, and the transmission loss of 0.44 dB/km.

Next, the characteristics of the dispersion compensating optical fiber of each example will be further explained with reference to FIGS. 6 to 11.

Figure 6:
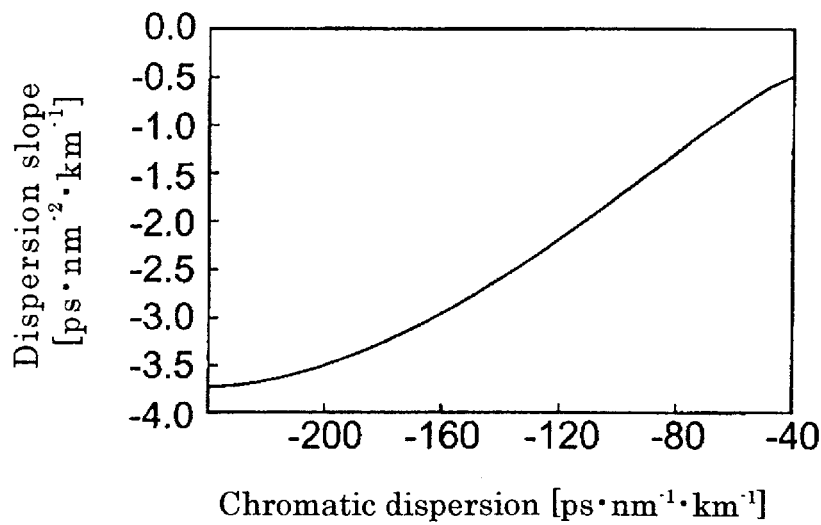
FIG. 6 is a graph showing the relationship between the chromatic dispersion and the dispersion slope of the first example of the dispersion compensating optical fiber when the outer diameter 2a of the central core region is altered while the ratios between the outer diameters of respective regions are kept constant.
Figure 7:
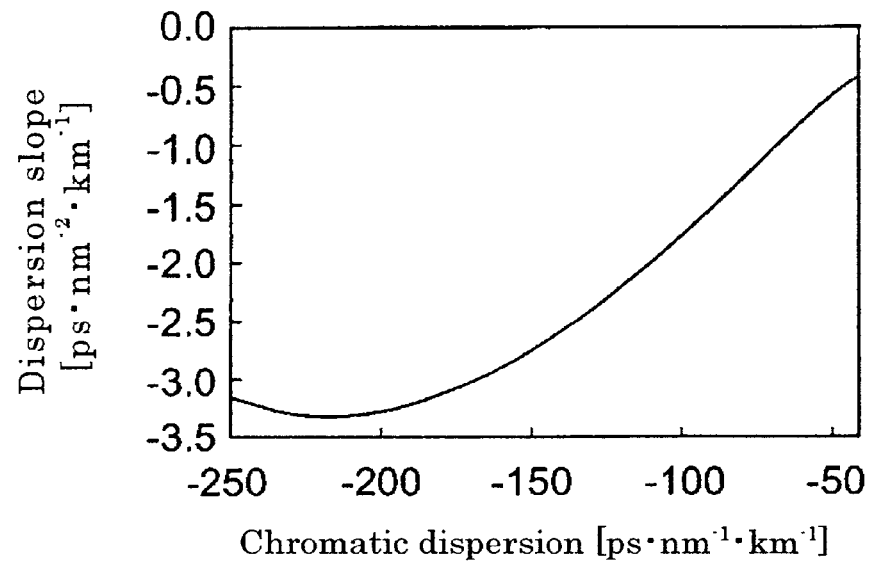
FIG. 7 is a graph showing the relationship between the chromatic dispersion and the dispersion slope of the second example of the dispersion compensating optical fiber when the outer diameter 2a of the central core region is altered while the ratios between the outer diameters of respective regions are kept constant.
Figure 8:
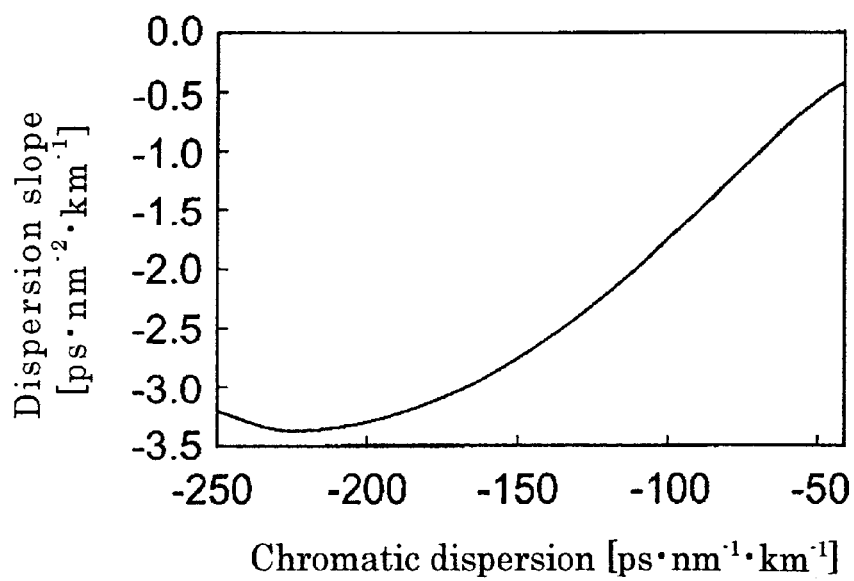
FIG. 8 is a graph showing the relationship between the chromatic dispersion and the dispersion slope of the third example of the dispersion compensating optical fiber when the outer diameter 2a of the central core region is altered while the ratios between the outer diameters of respective regions are kept constant.

FIGS. 6, 7, and 8 are graphs showing the relationship between the chromatic dispersion and the dispersion slope of the dispersion compensating optical fibers of the first, second, and third examples, respectively, when the outer diameter $2a$ of the central core region is altered while the ratios between the outer diameters of the respective regions are kept constant. With respect to the dispersion compensating optical fiber of the first example, when the outer diameter $2a$ of the central core region changes from 3.8 μm by 25%, the variation of the ratio ($S_{DCF}/D_{DCF}$) is 9.5%. As to the dispersion compensating optical fiber of the second example, when the outer diameter $2a$ of the central core region changes from 3.7 μm by 30%, the variation of the ratio ($S_{DCF}/D_{DCF}$) is 9.6%. As for the dispersion compensating optical fiber of the third example, when the outer diameter $2a$ of the central core region changes from 4.2 μm by 25%, the variation of the ratio ($S_{DCF}/D_{DCF}$) is 9.2%.

In the dispersion compensating optical fiber of each example, the variation of the ratio ($S_{DCF}/D_{DCF}$) is equal to or less than 1% when the variation of the outer diameter of the central core region is 2%, as described above, and hence this facilitates the manufacture of a dispersion compensating optical fiber having a desired dispersion characteristic. If the variation of the ratio ($S_{DCF}/D_{DCF}$) is equal to or less than 10% when the variation of the outer diameter of the central core region is 2% while the ratios of the outer diameters of the respective regions are kept constant, it is easy to manufacture a dispersion compensating optical fiber having a desired dispersion characteristic.

Figure 9:
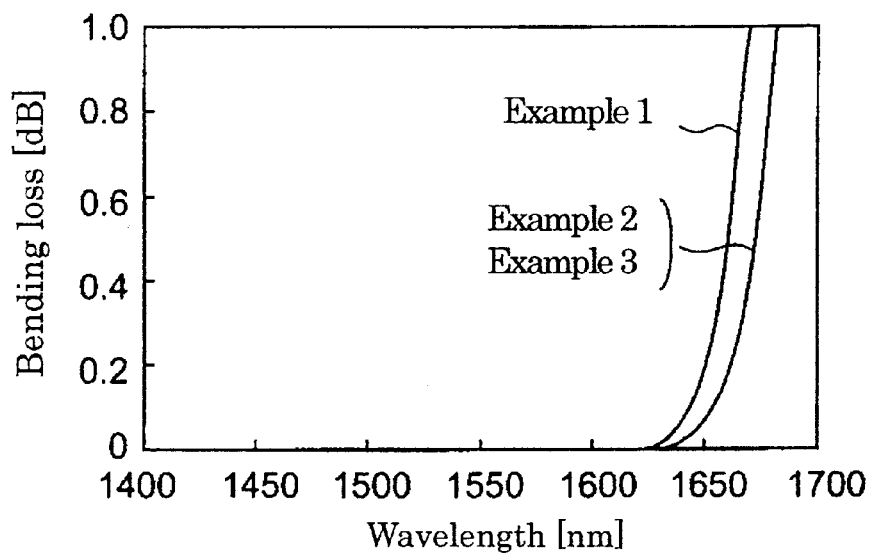
FIG. 9 is a graph showing the relationship between the wavelength and the bending loss at the bend diameter of 140 mm $\phi$ of each example of the dispersion compensating optical fiber.

FIG. 9 is a graph showing the relationship between the wavelength and the bending loss at the bend diameter 140 mm φ with respect to the respective examples of the dispersion compensating optical fiber. As can be seen in FIG. 9, for all examples of the dispersion compensating optical fiber, the bending loss at bend diameter 140 mm φ is very small in the 1.55 μm wavelength band which is the spectrum band of the light signal.

Figure 10:
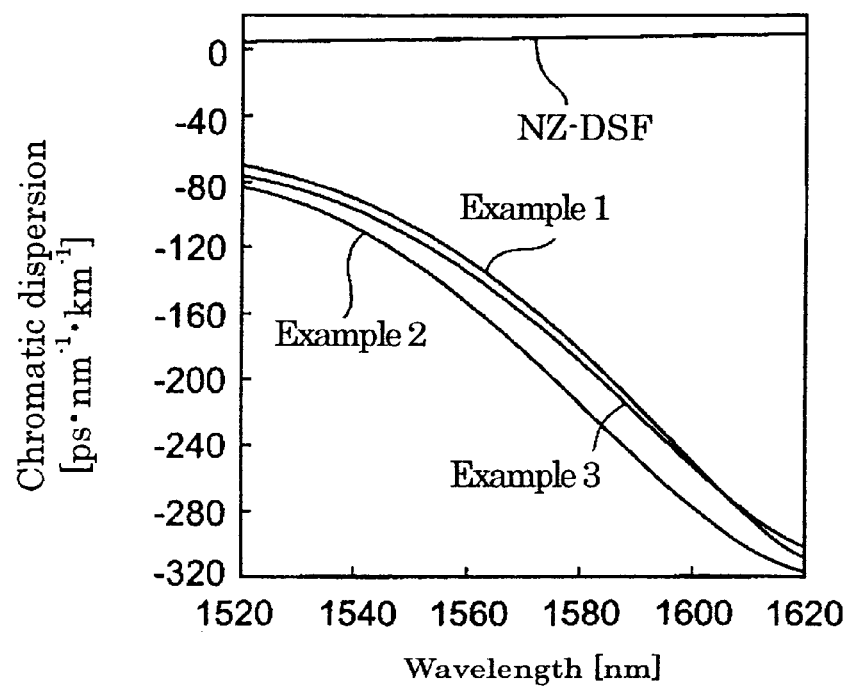
FIG. 10 is a graph showing the relationship between the wavelength and the chromatic dispersion of the dispersion compensating optical fiber of each example.

FIG. 10 is a graph showing the relationship between the wavelength and the chromatic dispersion of respective examples of the dispersion compensating optical fiber. This figure also shows the relationship between the wavelength and the chromatic dispersion of a dispersion-shifted optical fiber (NZDSF). This dispersion-shifted optical fiber has the chromatic dispersion $D_{DSF}$ of +4.5 ps·nm$^{-1}$·km$^{-1}$ at the 1550 nm wavelength and the dispersion slope $S_{DSF}$ of +0.072 ps·nm$^{-2}$·km$^{-1}$.

Figure 11:
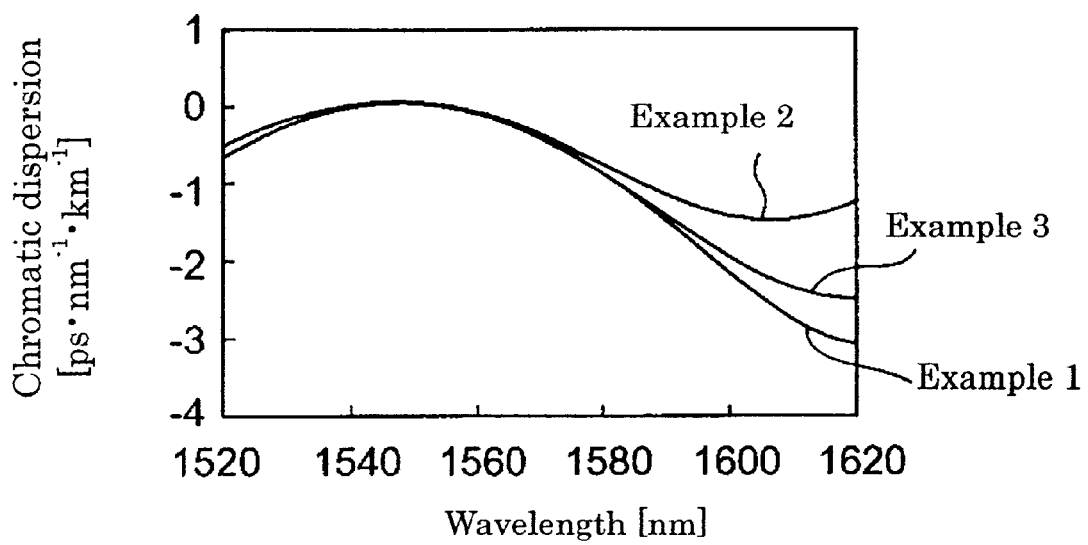
FIG. 11 is a graph showing the relationship between the wavelength and the chromatic dispersion of the optical transmission line that is produced by connecting the dispersion compensating optical fiber of each example and a dispersion-shifted optical fiber.

FIG. 11 is a graph showing the relationship between the wavelength and the chromatic dispersion of the optical transmission line that comprises the dispersion-shifted optical fiber connected to the dispersion compensating optical fiber of each example. The dispersion-shifted optical fiber that is assumed here has the chromatic dispersion characteristics shown in FIG. 10. As can be seen in FIG. 11, the absolute magnitude of the chromatic dispersion as well as the absolute magnitude of the dispersion slope of the optical transmission line is very small at the 1550 nm wavelength in all examples of the dispersion compensating optical fiber. The deviation of the chromatic dispersion of the optical transmission line is equal to or less than ±0.2 ps·nm$^{-1}$·km$^{-1}$ in the wavelength range of 1535 nm to 1560 nm in all examples of the dispersion compensating optical fiber.

Figure 12:
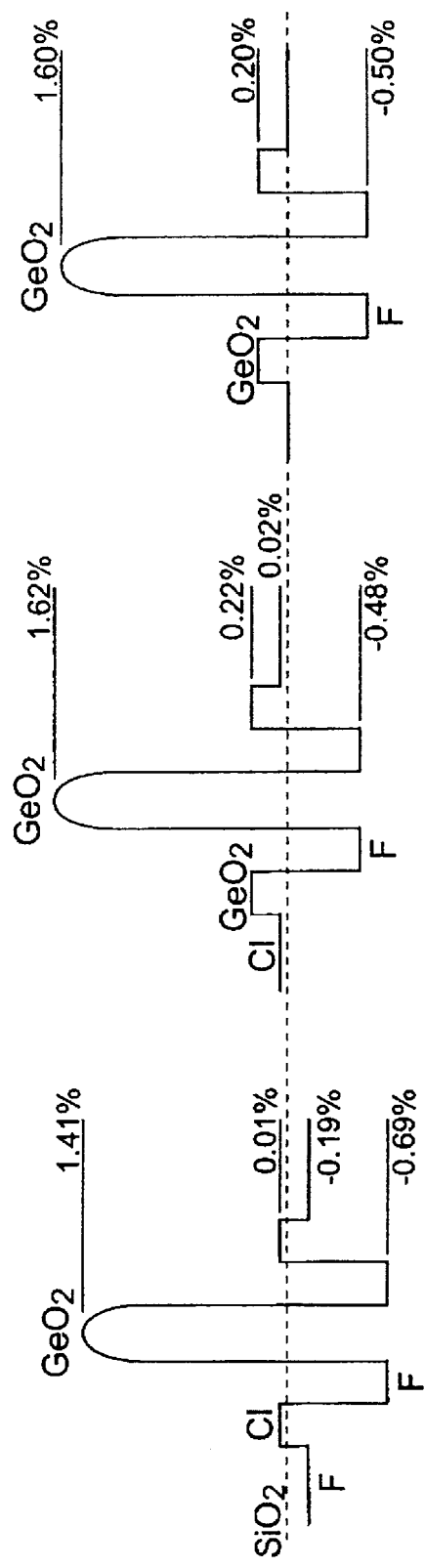
FIG. 12 depicts the relationship between the composition and the refractive index profile of the first example of the dispersion compensating optical fiber.

Next, the composition of the first example of the dispersion compensating optical fiber will be further explained. FIG. 12 depicts the relationship between the refractive index profile and the composition of the first example of the dispersion compensating optical fiber. In the refractive index profile shown in each of FIGS. 12A to 12C, the relative refractive index differences of the central core region, first cladding region and second cladding region based on the refractive index $n_4$ of the third cladding region are the same as those shown in FIG. 3. However, in reference to the refractive index of pure silica glass shown by a broken line in FIG. 12, there are possibly various modes of relative refractive index differences of the respective regions according to the composition of the regions. In the following, the relative refractive index difference $\Delta n_1$ of the central core region, the relative refractive index difference $\Delta n_2$ of the first cladding region, the relative refractive index difference $\Delta n_3$ of the second cladding region, and the relative refractive index difference $\Delta n_4$ of the third cladding region are expressed on the basis of the refractive index of pure silica glass as a standard.

The refractive index profile shown in FIG. 12A is obtained by adding the following elements to the respective regions made of silica glass as a base: $GeO_2$ to the central core region to attain the relative refractive index difference $\Delta n_1$ of +1.41%, F element to the first cladding region to attain the relative refractive index difference of $\Delta n_2$ of −0.69%, Cl element to the second cladding region to attain the relative refractive index difference $\Delta n_3$ of +0.01%, and F element to the third cladding region to attain the relative refractive index difference $\Delta n_4$ of −0.19%. The transmission loss of the dispersion compensating optical fiber having such refractive index profile is 0.30 dB/km.

The refractive index profile shown in FIG. 12B is obtained by adding the following elements to the respective regions made of silica glass as a base: $GeO_2$ to the central core region to attain the relative refractive index difference $\Delta n_1$ of +1.62%, F element to the first cladding region to attain the relative refractive index difference $\Delta n_2$ of −0.48%, $GeO_2$ to the second cladding region to attain the relative refractive index difference $\Delta n_3$ of +0.22%, and Cl element to the third cladding region to attain the relative refractive index difference $\Delta n_4$ of +0.02%. The transmission loss of the dispersion compensating optical fiber having such refractive index profile is 0.35 dB/km.

The refractive index profile shown in FIG. 12C is obtained by adding elements to the respective regions made of silica glass as a base as follows: $GeO_2$ to the central core region to attain the relative refractive index difference $\Delta n_1$ of +1.60%, F element to the first cladding region to obtain the relative refractive index difference $\Delta n_2$ of −0.50%, $GeO_2$ to the second cladding region to attain the relative refractive index difference $\Delta n_3$ of +0.20%, and no element to the third cladding region to attain the relative refractive index difference $\Delta n_4$ of 0%. The transmission loss of the dispersion compensating optical fiber having such refractive index profile is 0.39 dB/km.

The comparison between the compositions and the transmission loss in the respective examples shown in FIGS. 12A to 12C lead to the following conclusion. That is, the transmission loss of the dispersion compensating optical fiber is smaller in the case (FIG. 12B) where Cl element is added to the third cladding region than the case (FIG. 12C) where the third cladding region at the outermost layer is pure silica, and the case (FIG. 12A) where F element is added to the third cladding region is the smallest. Also, the transmission loss decreases when P element is added to the third cladding region at the outermost layer, which is not illustrated. This is because, when an optical fiber preform is drawn into a dispersion compensating optical fiber, the viscosity at the outermost layer that accounts for most of the optical fiber preform decreases, thereby allowing the drawing temperature to be made relatively low. Decreasing the drawing temperature leads to the lessening of thermal fluctuation, which results in the reduction of flaws such as GeO caused by the pyrolysis of $GeO_2$ that is added to the central core region. This results in the decrease of transmission loss. Especially, when F element is added to the third cladding region at the outermost layer, the transmission loss is reduced because less $GeO_2$ is added to the central core region through which much of the optical power propagates.

Figure 13:
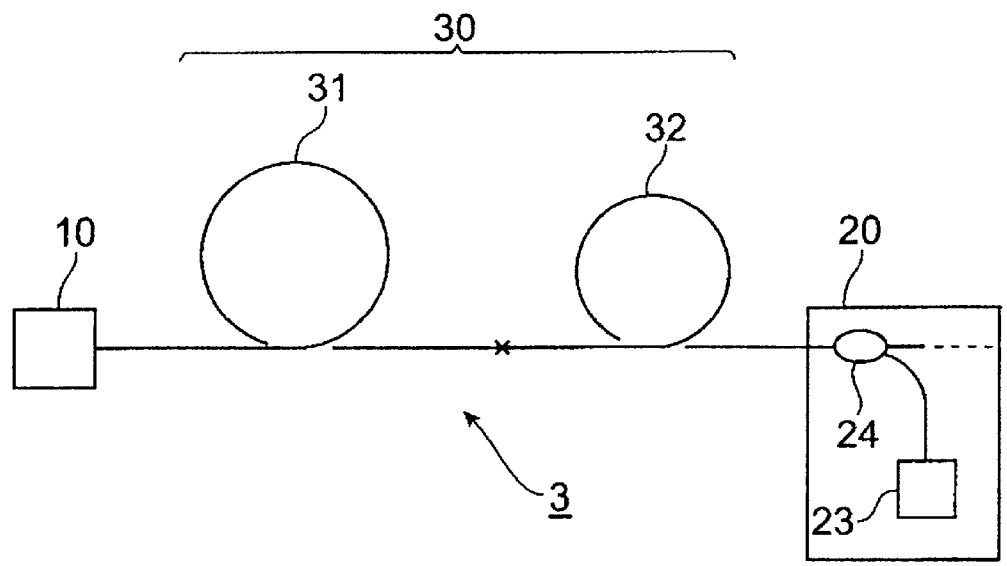
FIG. 13 is a schematic diagram of another constitution of an optical transmission system that includes the optical transmission line according to one embodiment of the present invention.

Next, the other composition of the optical transmission system that includes the optical transmission line according to one embodiment of the present invention will be explained. FIG. 13 is a schematic diagram of another constitution of the optical transmission system that includes the optical transmission line according to the present embodiment. The optical transmission system 3 shown in this figure is equipped with a pump light supplying means for Raman amplification that consists of a pump light source 23 for Raman amplification and an optical multiplexer/demultiplexer 24 inside the station 20 of the optical transmission system 1 shown in FIG. 1. The pump light source 23 for Raman amplification outputs pump light for Raman amplification, and the optical multiplexer/demultiplexer 24 supplies the pump light for Raman amplification that has been output from the pump light source 23 for Raman amplification to the dispersion compensating optical fiber 32. If the light signal is in the 1.55 μm wavelength band, the wavelength of the pump light for Raman amplification is about 1.45 μm. The optical multiplexer/demultiplexer 24 may be made of an optical fiber coupler, planer waveguides, or an interference filter and lens.

In the optical transmission system 3, the light signals of multi-wavelengths in the 1.55 μm wavelength that have been emitted from the station 10 propagate through the dispersion-shifted optical fiber 31 and the dispersion compensating optical fiber 32 in the enumerated order, and reach the station 20, where they pass through the optical multiplexer/demultiplexer 24 to be received, or optically amplified in the station 20 to be discharged to the downstream. When the light signals propagate through the dispersion compensating optical fiber 32, they are Raman-amplified by the pump light for Raman amplification to be supplied to the dispersion compensating optical fiber 32.

Generally, the dispersion compensating optical fiber has high nonlinearity compared to the dispersion-shifted optical fiber. Therefore, as in the optical transmission system 3, by supplying pump light for Raman amplification to the dispersion compensating optical fiber 32 whose nonlinearity is comparatively high, light signals can be amplified by the stimulated Raman effect efficiently over the wide wavelength range.

Figure 14:
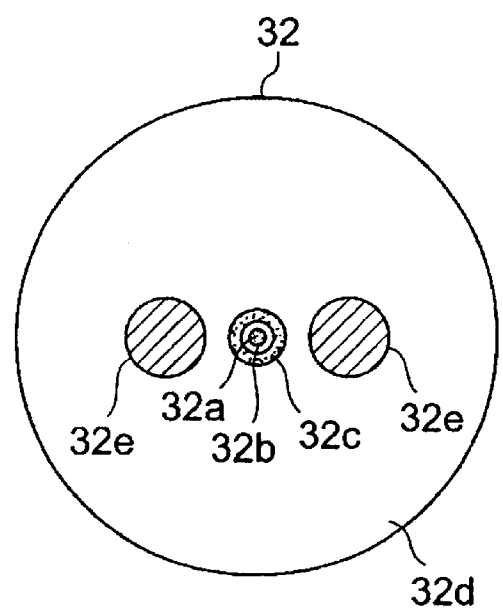
FIG. 14 is a sectional view of the dispersion compensating optical fiber according to one embodiment of the present invention.

Next, a more preferable mode of the dispersion compensating optical fiber according to one embodiment of the present invention will be explained. FIG. 14 is a sectional view of the dispersion compensating optical fiber according to the present embodiment. The dispersion compensating optical fiber 32 shown in this figure is such that, in the refractive index profile shown in FIG. 3 as a preferable example, two stress-giving parts 32e which are means for maintaining the polarization mode of propagating light are provided in the third cladding region 32d at the outermost layer. The central core region 32a, the first cladding region 32b, and the second cladding region 32c are positioned between the stress-giving parts 32e. The two stress-giving parts 32e are composed of $B_2O_3$—$SiO_2$, for example, and are continuously provided longitudinally. The stress-giving parts 32e afford the dispersion compensating optical fiber 32 anisotropic stress to cause birefringence, and thereby maintain the polarization mode of propagating light. Providing the stress-giving parts 32e can restrain the occurrence of random coupling between the polarization modes of light signals propagating through the dispersion compensating optical fiber 32. Accordingly, the deterioration of the transmission quality can be restrained.

What is claimed is:

1. An optical fiber whose chromatic dispersion $D_{DCF}$ and dispersion slope $S_{DCF}$ satisfy the following relational expressions at the 1550 nm wavelength:

$-250 \cdot ps \cdot nm^{-1} \cdot km^{-1} \leq D_{DCF} \leq -40 ps \cdot nm^{-1} \cdot km^{-1}$ $0.015 \text{ nm}^{-1} \leq S_{DCF}/D_{DCF} \leq 0.030 \text{ nm}^{-1}$ wherein said optical fiber comprises a central core region having a first refractive index, a first cladding region surrounding said central core region and having a second refractive index which is smaller than said first refractive index, and the variation of ratio ($S_{DCF}/D_{DCF}$) is equal to or less than 10% when the outer diameter of said central core region is altered by 2% while the ratio of the respective outer diameters of said central core region and said first cladding region are kept constant.

2. An optical fiber according to claim 1, wherein the effective area is in the range of 13 $\mu m^2$ to 17 $\mu m^2$ at the 1550 nm wavelength.

3. An optical fiber according to claim 1, wherein the effective area is in the range of 17 $\mu m^2$ to 20 $\mu m^2$ at the 1550 nm wavelength.

4. An optical fiber according to claim 1, wherein the effective area is equal to or more than 20 $\mu m^2$ at the 1550 nm wavelength.

5. An optical fiber according to claim 1, wherein the cutoff wavelength is in the range of 1.2 μm to 1.8 μm.

6. An optical fiber according to claim 1, wherein the transmission loss is 0.5dB/km or less at the 1550 nm wavelength.

7. An optical fiber according to claim 1, further comprising:

a second cladding region surrounding said first cladding region and having a third refractive index which is greater than said second refractive index, and a third cladding region surrounding said second cladding region and having a fourth refractive index which is smaller than said third refractive index.

8. An optical fiber according to claim 7, wherein the relative refractive index difference of said center core region is in the range of 0.8% to 2.0% in reference to the refractive index of the outermost layer region as a standard.

9. An optical fiber according to claim 7, wherein the relative refractive index difference of said first cladding region is equal to or less than −0.4% in reference to the refractive index of the outermost layer as a standard.

10. An optical fiber according to claim 7, wherein said optical fiber is made of silica glass as the main component and the outermost layer region is doped with any of F element, P element or Cl.

11. An optical fiber whose chromatic dispersion $D_{DCF}$ and dispersion slope $S_{DCF}$ satisfy the following relational expressions at the 1550 nm wavelength:

$$-250 \text{ ps·nm}^{-1}\text{·km}^{-1} \leq D_{DCF} \leq -40 \text{ps·nm}^{-1}\text{·km}^{-1}$$

$$0.015 \text{ nm}^{-1} \leq S_{DCF}/D_{DCF} \leq 0.030 \text{ nm}^{-1}$$

and being provided with a means for maintaining the polarization mode of propagating light.

12. An optical transmission system comprising a dispersion compensating module and a dispersion-shifted optical fiber, wherein
said dispersion-shifted optical fiber having a chromatic dispersion in the range of +2 ps·nm$^{-1}$·km$^{-1}$ to +10 ps·nm$^{-1}$·km$^{-1}$ and a dispersion slope in the range of +0.04 ps·nm$^{-2}$·km$^{-1}$ to +0.12 ps·nm$^{-2}$·km$^{-1}$ at the 1550 nm wavelength; and
said dispersion compensating module is composed of an optical fiber wound in a coil form without an arbor, the form of said coil being fixed by an interior comprising a resin and said optical fiber having a chromatic dispersion $D_{DCF}$ and a dispersion slope $S_{DCF}$ that satisfy the following relationship at the 1550 nm wavelength:

$$-250 \text{ ps·nm}^{-1}\text{·km}^{-1} < D_{DCF} < -40 \text{ ps·nm}^{-1}\text{·km}^{-1}$$

$$0.015 \text{ nm}^{-1} < S_{DCF}/D_{DCF} < 0.030 \text{ nm}^{-1},$$

13. An optical transmission system comprising an optical fiber, a dispersion-shifted optical fiber, and a multiplexer/demultiplexer,
said optical fiber having a chromatic dispersion $D_{DCF}$ and a dispersion slope $S_{DCF}$ satisfy the following relational expressions at the 1550 nm wavelength:

$$-250 \text{ ps·nm}^{-1}\text{·km}^{-1} \leq D_{DCF} - 40 \text{ ps·nm}^{-1}\text{·km}^{-1}$$

$$0.015 \text{ nm}^{-1} \leq S_{DCF}/D_{DCF} \leq 0.030 \text{ nm}-1$$

said dispersion-shifted optical fiber having a chromatic dispersion in the range of +2 ps·nm$^{-1}$·km$^{-1}$ to +10 ps·nm$^{-1}$·km$^{-1}$ and a dispersion slope in the range of +0.04 ps·nm$^{-2}$ km$^{-1}$ to +0.12 ps·nm$^{-2}$km$^{-1}$ at the 1550 nm wavelength, and said multiplexer/demultiplexer introducing pump light for Raman amplification.

14. An optical transmission system according to claim 12, wherein the deviation of the average chromatic dispersion is ±35 0.2 ps·nm$^{-1}$·km$^{-1}$ or less at a wavelength in the range of 1535 nm of 1560 nm.

15. A dispersion compensating module, which is composed of an optical fiber wound in a coil form without an arbor, said optical fiber having a chromatic dispersion $D_{DCF}$ and a dispersion slope $S_{DCF}$ that satisfy the following relationship at the 1550 nm wavelength:

$$-250 \text{ ps·nm}^{-1}\text{·km}^{-1} \leq D_{DCF} - 40 \text{ ps·nm}^{-1}\text{·km}^{-1}$$

$$0.015 \text{ nm}^{-1} \leq S_{DCF}/D_{DCF} \leq 0.030 \text{ nm}^{-1}$$

wherein the form of said coil is fixed by an inner space filled with a resin.

16. An optical fiber according to claim 7, further comprising a fourth cladding region surrounding said third cladding region and having a fifth refractive index which is greater than said fourth refractive index.

17. An optical fiber whose chromatic dispersion $D_{DCF}$ and dispersion slope $S_{DCF}$ satisfy the following rational expressions at the 1550 nm wavelength:

$$-250 \text{ ps·nm}^{-1}\text{·km}^{-1} \leq D_{DCF} \leq -40 \text{ ps·nm}^{-1}\text{·km}^{-1},$$

$$0.015 \text{ nm}^{-1} \leq S_{DCF}/D_{DCF} \leq 0.030 \text{ nm}^{-1},$$

and being provided with:
a central core region having a first refractive index,
a first cladding region surrounding said central core region and having a second refractive index which is smaller than said first refractive index,
a second cladding region surrounding said first cladding region and having a third refractive index which is greater than said second refractive index,
a third cladding region surrounding said second cladding region and having a fourth refractive index which is smaller than said third refractive index, and
a fourth cladding region surrounding said third cladding region and having a fifth refractive index which is greater than said fourth refractive index.

18. An optical fiber according to claim 17, further comprising a fifth cladding region surrounding said fourth cladding region and having a sixth refractive index which is smaller than said fifth refractive index.

19. An optical fiber according to claim 17, wherein the relative refractive index difference of said center core region is in the range of 0.8% to 2.0% in reference to the refractive index of the outermost layer region as a standard.

20. An optical fiber according to claim 17, wherein the relative refractive index difference of said first cladding region is equal to or less than −0.4% in reference to the refractive index of the outermost layer as a standard.

21. A dispersion compensating module, which is composed of an optical fiber claimed in claim 17 wound in a coil form.

22. An optical transmission system comprising a dispersion compensating module claimed in claim 21 and a dispersion-shifted optical fiber,
said dispersion-shifted optical fiber having a chromatic dispersion in the range of +2 ps·nm$^{-1}$·km$^{-1}$ to +10 ps·nm$^{-1}$·km$^{-1}$ and a dispersion slope in the range of +0.04 ps·nm$^{-2}$·km$^{-1}$ to +0.12 ps·nm$^{-2}$·km$^{-1}$ at the 1550 nm wavelength.

23. An optical transmission system according to claim 22, wherein the deviation of the average chromatic dispersion is ±0.2 ps·nm$^{-1}$·km$^{-1}$ or less at a wavelength in the range of 1535 nm to 1560 nm.

* * * * *

UNITED STATES PATENT AND TRADEMARK OFFICE
CERTIFICATE OF CORRECTION

PATENT NO.    : 6,782,172 B2
DATED         : August 24, 2004
INVENTOR(S)   : Masaaki Hirano et al.

It is certified that error appears in the above-identified patent and that said Letters Patent is hereby corrected as shown below:

Column 13,
Lines 15-16, change "-250 ps · nm$^{-1}$ · km$^{-1}$ < $D_{DCF}$ < -40 ps · nm$^{-1}$ · km$^{-1}$ 0.015 nm$^{-1}$ < $S_{DCF}/D_{DCF}$ < 0.030 nm$^{-1}$," to -- -250 ps · nm$^{-1}$ · km$^{-1}$ ≦ $D_{DCF}$ ≦ -40 ps · nm$^{-1}$ · km$^{-1}$ 0.015 nm$^{-1}$ ≦ $S_{DCF}/D_{DCF}$ ≦ 0.030 nm$^{-1}$, --

Line 46, change "-250 ps · nm$^{-1}$ · km$^{-1}$ ≦ $D_{DCF}$ -40 ps · nm$^{-1}$ · km$^{-1}$ 0.015 nm$^{-1}$ ≦ $S_{DCF}/D_{DCF}$ ≦ 0.030 nm$^{-1}$" to -- -250 ps · nm$^{-1}$ · km$^{-1}$ ≦ $D_{DCF}$ ≦ -40 ps · nm$^{-1}$ · km$^{-1}$ 0.015 nm$^{-1}$ ≦ $S_{DCF}/D_{DCF}$ ≦ 0.030 nm$^{-1}$; and --

Lines 4-54, change "-250 ps · nm$^{-1}$ · km$^{-1}$ < $D_{DCF}$ < -40 ps · nm$^{-1}$ · km$^{-1}$ 0.015 nm$^{-1}$ ≦ $S_{DCF}/D_{DCF}$ ≦ 0.030 nm$^{-1}$,
    said dispersion-shifted optical fiber having a chromatic dispersion in the range of +2 ps · nm$^{-1}$ · km$^{-1}$ to +10 ps · nm$^{-1}$ · km$^{-1}$ and a dispersion slope in the range of + 0.04 ps · nm$^{-2}$ · km$^{-1}$ to +0.12 ps · nm$^{-2-}$ · km$^{-1}$ at the 1550 nm wavelength," to -- -250 ps · nm$^{-1}$ · km$^{-1}$ ≦ $D_{DCF}$ ≦ -40 ps · nm$^{-1}$ · km$^{-1}$ 0.015 nm$^{-1}$ ≦ $S_{DCF}/D_{DCF}$ ≦ 0.030 nm$^{-1}$,
    said dispersion-shifted optical fiber having a chromatic dispersion in the range of +2 ps · nm$^{-1}$ · km$^{-1}$ to +10 ps · nm$^{-1}$ · km$^{-1}$ and a dispersion slope in the range of + 0.04 ps · nm$^{-2}$ · km$^{-1}$ to +12 ps · nm$^{-2}$ · km$^{-1}$ at the 1550 nm wavelength, --;

Line 56, change "14. An optical transmission system according to Claim 12, wherein the deviation of the average chromatic dispersion is ± 35 0.2 ps · nm$^{-1}$ · km$^{-1}$ or less at a wavelength in the range of 1535 nm of 1560 nm." to -- 14. An optical transmission system according to Claim 12, wherein the deviation of the average chromatic dispersion is ± 0.2 ps · nm$^{-1}$ · km$^{-1}$ or less at a wavelength in the range of 1535 nm of 1560 nm. --;

UNITED STATES PATENT AND TRADEMARK OFFICE
CERTIFICATE OF CORRECTION

PATENT NO. : 6,782,172 B2
DATED : August 24, 2004
INVENTOR(S) : Masaaki Hirano et al.

It is certified that error appears in the above-identified patent and that said Letters Patent is hereby corrected as shown below:

<u>Column 14,</u>
Line 17, change "-250 ps · nm$^{-1}$ · km$^{-1}$ $\leq$ D$_{DCF}$ -40 ps · nm$^{-1}$ · km$^{-1}$ 0.015 nm$^{-1}$ $\leq$ S$_{DCF}$/D$_{DCF}$ $\leq$ 0.030 nm$^{-1}$" to -- -250 ps · nm$^{-1}$ · km$^{-1}$ $\leq$ D$_{DCF}$ $\leq$ -40 ps · nm$^{-1}$ · km$^{-1}$ 0.015 nm$^{-1}$ $\leq$ S$_{DCF}$/D$_{DCF}$ $\leq$ 0.030 nm$^{-1}$; and --

Signed and Sealed this

Fifth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,782,172 B2
DATED : August 24, 2004
INVENTOR(S) : Masaaki Hirano et al.

It is certified that error appears in the above-identified patent and that said Letters Patent is hereby corrected as shown below:

Column 13,
Lines 34-37, change "-250 ps · nm$^{-1}$ · km$^{-1}$ < $D_{DCF}$ < -40 ps · nm$^{-1}$ · km$^{-1}$ 0.015 nm$^{-1}$ < $S_{DCF}/D_{DCF}$ < 0.030 nm$^{-1}$," to -- -250 ps · nm$^{-1}$ · km$^{-1}$ $\leq$ $D_{DCF}$ $\leq$ -40 ps · nm$^{-1}$ · km$^{-1}$ 0.015 nm$^{-1}$ $\leq$ $S_{DCF}/D_{DCF}$ $\leq$ 0.030 nm$^{-1}$, --
Line 46, change "-250 ps · nm$^{-1}$ · km$^{-1}$ $\leq$ $D_{DCF}$ -40 ps · nm$^{-1}$ · km$^{-1}$ 0.015 nm$^{-1}$ $\leq$ $S_{DCF}/D_{DCF}$ $\leq$ 0.030 nm$^{-1}$" to -- -250 ps · nm$^{-1}$ · km$^{-1}$ $\leq$ $D_{DCF}$ $\leq$ -40 ps · nm$^{-1}$ · km$^{-1}$ 0.015 nm$^{-1}$ $\leq$ $S_{DCF}/D_{DCF}$ $\leq$ 0.030 nm$^{-1}$; and --
Lines 4-54, change "-250 ps · nm$^{-1}$ · km$^{-1}$ $\leq$ $D_{DCF}$ -40 ps · nm$^{-1}$ · km$^{-1}$ 0.015 nm$^{-1}$ $\leq$ $S_{DCF}/D_{DCF}$ $\leq$ 0.030 nm$^{-1}$ said dispersion-shifted optical fiber having a chromatic dispersion in the range of +2 ps · nm$^{-1}$ · km$^{-1}$ to +10 ps · nm$^{-1}$ · km$^{-1}$ and a dispersion slope in the range of + 0.04 ps · nm$^{-2}$ · km$^{-1}$ to +0.12 ps · nm$^{-2}$ · km$^{-1}$ at the 1550 nm wavelength," to -- -250 ps · nm$^{-1}$ · km$^{-1}$ $\leq$ $D_{DCF}$ $\leq$ -40 ps · nm$^{-1}$ · km$^{-1}$ 0.015 nm$^{-1}$ $\leq$ $S_{DCF}/D_{DCF}$ $\leq$ 0.030 nm$^{-1}$ said dispersion-shifted optical fiber having a chromatic dispersion in the range of +2 ps · nm$^{-1}$ · km$^{-1}$ to +10 ps · nm$^{-1}$ · km$^{-1}$ and a dispersion slope in the range of + 0.04 ps · nm$^{-2}$ · km$^{-1}$ to +0.12 ps · nm$^{-2}$ · km$^{-1}$ at the 1550 nm wavelength, --;
Line 56, change "14. An optical transmission system according to Claim 12, wherein the deviation of the average chromatic dispersion is $\pm$ 35 0.2 ps · nm$^{-1}$ · km$^{-1}$ or less at a wavelength in the range of 1535 nm of 1560 nm." to -- 14. An optical transmission system according to Claim 12, wherein the deviation of the average chromatic dispersion is $\pm$ 0.2 ps · nm$^{-1}$ · km$^{-1}$ or less at a wavelength in the range of 1535 nm of 1560 nm. --;

UNITED STATES PATENT AND TRADEMARK OFFICE
CERTIFICATE OF CORRECTION

PATENT NO. : 6,782,172 B2
DATED : August 24, 2004
INVENTOR(S) : Masaaki Hirano et al.

It is certified that error appears in the above-identified patent and that said Letters Patent is hereby corrected as shown below:

Column 14,
Lines 3-6, change "-250 ps · nm$^{-1}$ · km$^{-1}$ ≦ D$_{DCF}$ -40 ps · nm$^{-1}$ · km$^{-1}$ 0.015 nm$^{-1}$ ≦ S$_{DCF}$/D$_{DCF}$ ≦ 0.030 nm$^{-1}$" to -- -250 ps · nm$^{-1}$ · km$^{-1}$ ≦ D$_{DCF}$ ≦ -40 ps · nm$^{-1}$ · km$^{-1}$ 0.015 nm$^{-1}$ ≦ S$_{DCF}$/D$_{DCF}$ ≦ 0.030 nm$^{-1}$; and --

This certificate supersedes Certificate of Correction issued April 5, 2005.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,782,172 B2
DATED : August 24, 2004
INVENTOR(S) : Masaaki Hirano et al.

It is certified that error appears in the above-identified patent and that said Letters Patent is hereby corrected as shown below:

Column 13,
Lines 34-37, change "-250 ps · $nm^{-1}$ · $km^{-1}$ < $D_{DCF}$ < -40 ps · $nm^{-1}$ · $km^{-1}$ 0.015 $nm^{-1}$ < $S_{DCF}/D_{DCF}$ < 0.030 $nm^{-1}$," to -- -250 ps · $nm^{-1}$ · $km^{-1}$ $\leq$ $D_{DCF}$ $\leq$ -40 ps · $nm^{-1}$ · $km^{-1}$ 0.015 $nm^{-1}$ $\leq$ $S_{DCF}/D_{DCF}$ $\leq$ 0.030 $nm^{-1}$, --

Lines 46-54, change "-250 ps · $nm^{-1}$ · $km^{-1}$ $\leq$ $D_{DCF}$ -40 ps · $nm^{-1}$ · $km^{-1}$ 0.015 $nm^{-1}$ $\leq$ $S_{DCF}/D_{DCF}$ $\leq$ 0.030 $nm^{-1}$ said dispersion-shifted optical fiber having a chromatic dispersion in the range of +2 ps · $nm^{-1}$ · $km^{-1}$ to +10 ps · $nm^{-1}$ · $km^{-1}$ and a dispersion slope in the range of + 0.04 ps · $nm^{-2}$ · $km^{-1}$ to +0.12 ps · $nm^{-2}$ · $km^{-1}$ at the 1550 nm wavelength," to -- -250 ps · $nm^{-1}$ · $km^{-1}$ $\leq$ $D_{DCF}$ $\leq$ -40 ps · $nm^{-1}$ · $km^{-1}$ 0.015 $nm^{-1}$ $\leq$ $S_{DCF}/D_{DCF}$ $\leq$ 0.030 $nm^{-1}$ said dispersion-shifted optical fiber having a chromatic dispersion in the range of +2 ps · $nm^{-1}$ · $km^{-1}$ to +10 ps · $nm^{-1}$ · $km^{-1}$ and a dispersion slope in the range of + 0.04 ps · $nm^{-2}$ · $km^{-1}$ to +0.12 ps · $nm^{-2}$ · $km^{-1}$ at the 1550 nm wavelength, --;

Line 56, change "14. An optical transmission system according to Claim 12, wherein the deviation of the average chromatic dispersion is $\pm$ 35 0.2 ps · $nm^{-1}$ · $km^{-1}$ or less at a wavelength in the range of 1535 nm of 1560 nm." to -- 14. An optical transmission system according to Claim 12, wherein the deviation of the average chromatic dispersion is $\pm$ 0.2 ps · $nm^{-1}$ · $km^{-1}$ or less at a wavelength in the range of 1535 nm of 1560 nm. --;

UNITED STATES PATENT AND TRADEMARK OFFICE
CERTIFICATE OF CORRECTION

PATENT NO. : 6,782,172 B2
DATED : August 24, 2004
INVENTOR(S) : Masaaki Hirano et al.

It is certified that error appears in the above-identified patent and that said Letters Patent is hereby corrected as shown below:

<u>Column 14,</u>
Lines 3-6, change "-250 ps · nm$^{-1}$ · km$^{-1}$ ≦ D$_{DCF}$ -40 ps · nm$^{-1}$ · km$^{-1}$ 0.015 nm$^{-1}$ ≦ S$_{DCF}$/D$_{DCF}$ ≦ 0.030 nm$^{-1}$" to -- -250 ps · nm$^{-1}$ · km$^{-1}$ ≦ D$_{DCF}$ ≦ -40 ps · nm$^{-1}$ · km$^{-1}$ 0.015 nm$^{-1}$ ≦ S$_{DCF}$/D$_{DCF}$ ≦ 0.030 nm$^{-1}$; and --

This certificate supersedes Certificate of Correction issued April 5, 2005 and May 24, 2005.

Signed and Sealed this

Twenty-sixth Day of July, 2005

JON W. DUDAS
*Director of the United States Patent and Trademark Office*